Figure 1:
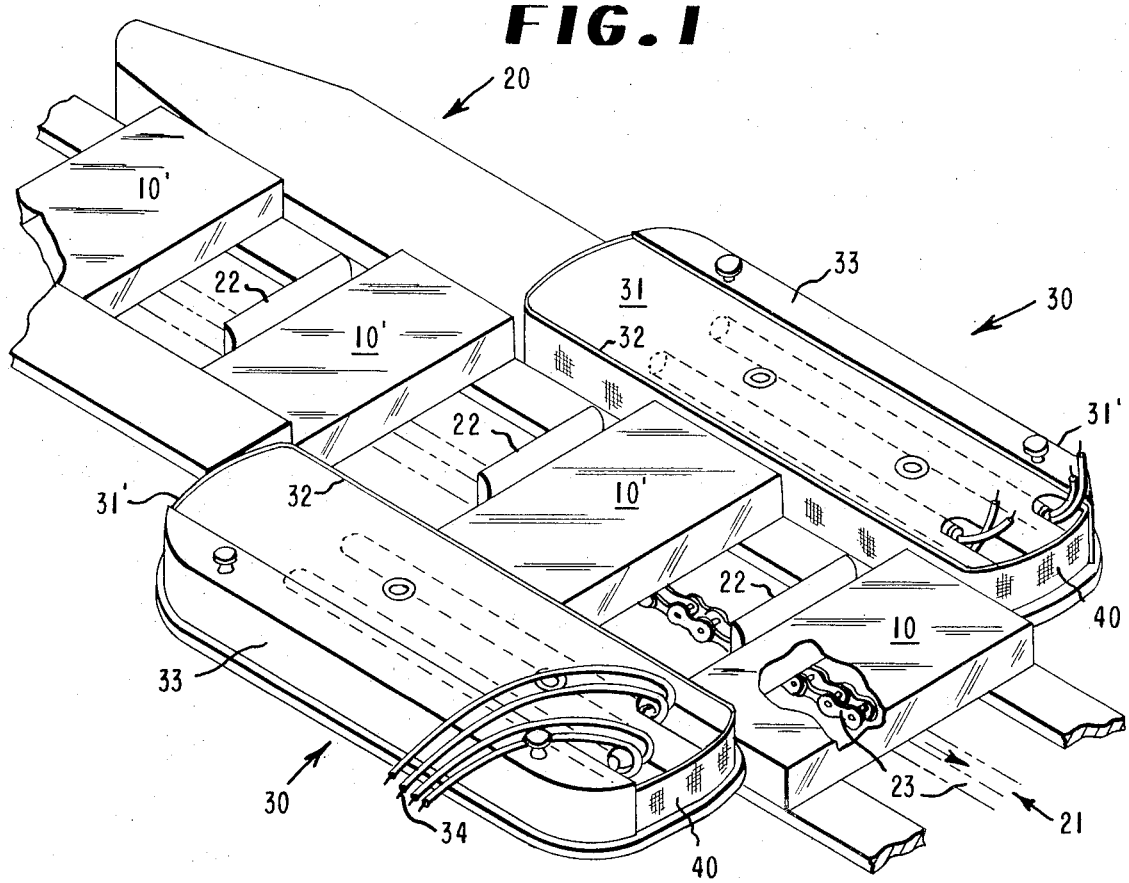
Figure 2:
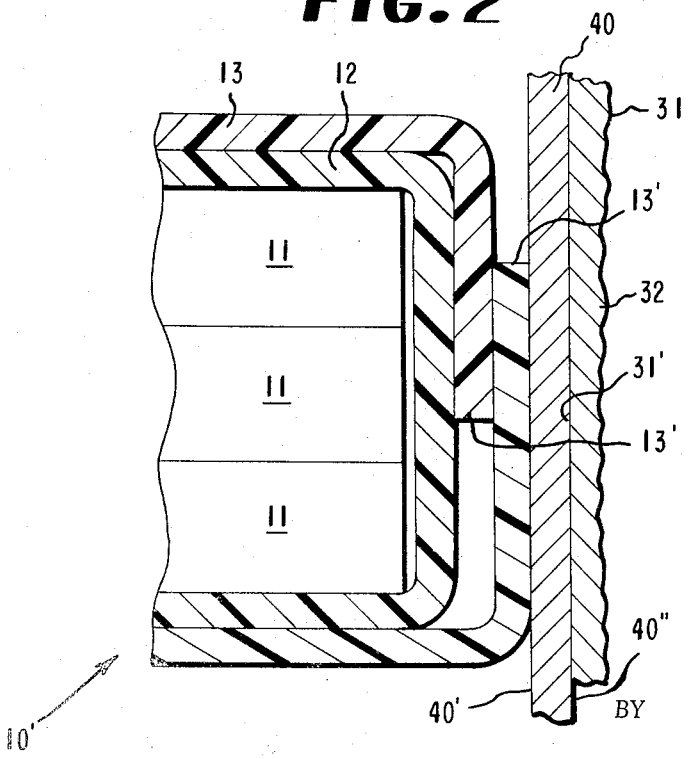
Figure 3:
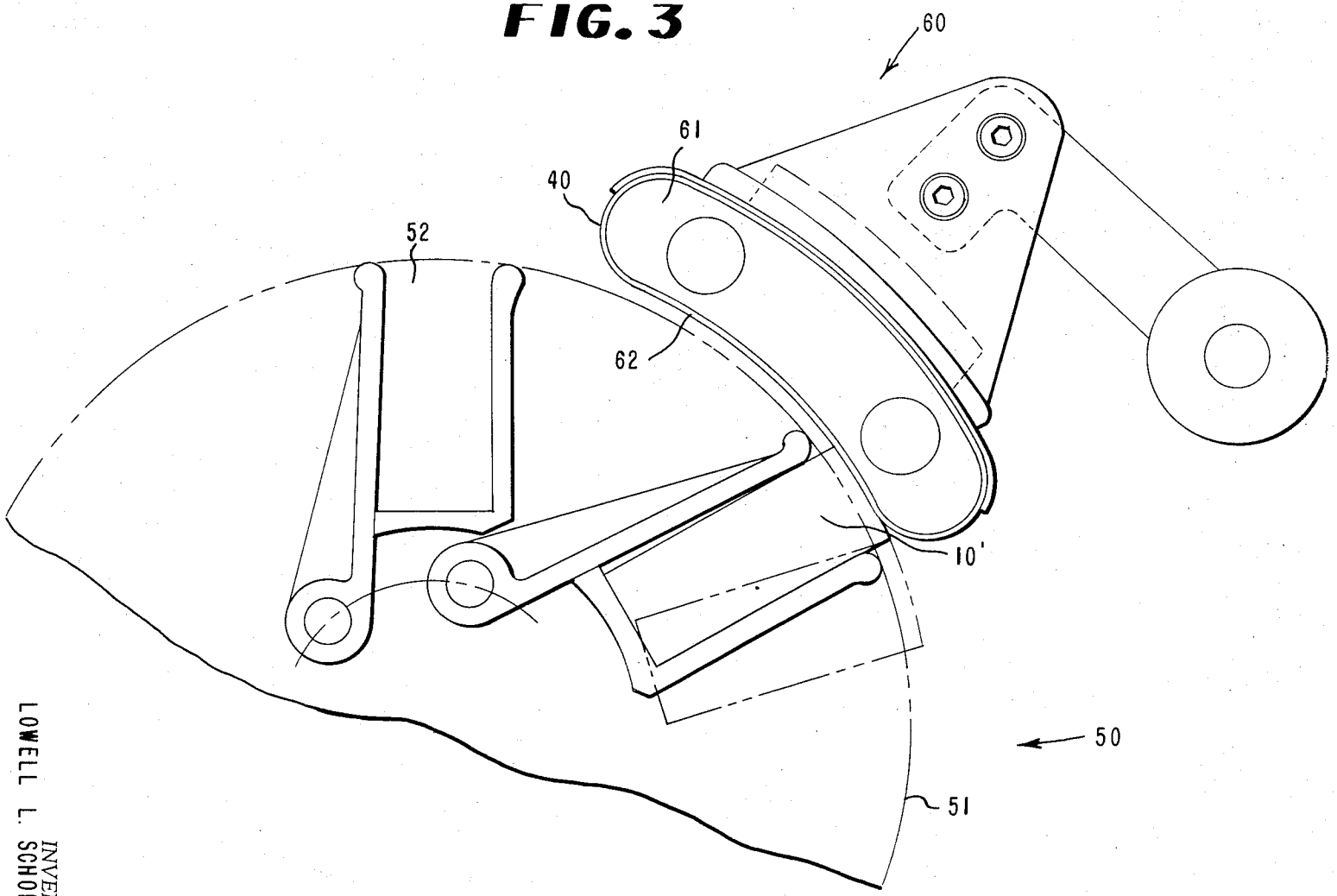

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 7

T920,006
PACKAGE MAKING METHOD

Lowell L. Schoening, Wilmington, Del., assignor to E. I. du Pont de Nemours and Company, Wilmington, Del.

Continuation of application Ser. No. 149,579, June 3, 1971. This application Apr. 16, 1973, Ser. No. 351,627
Int. Cl. B65b *51/18*
U.S. Cl. 53—39
2 Sheets Drawing. 5 Pages Specification

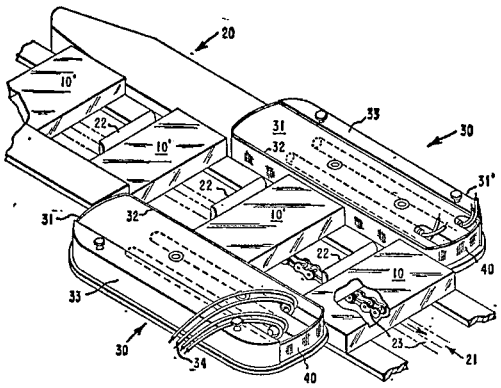

A method of making a package consisting of a package unit overwrapped in a heat-sealable material having overlapping parts on at least one side thereof, such method including the steps of:

positioning a porous belt loosely about a stationary heating means having a sealing plate;

heating the belt;

moving the overwrapped package unit past the sealing plate;

urging, by means of the inherent resiliency and size of the overwrapped package unit and spacings of parts of the apparatus for making the package, the overlapping parts into an abutting relationship with one surface of the belt only after it is heated thereby to start heating substantially immediately such overlapping parts as they are brought into contact with the belt, whereby to bring about a tacky state in the overlapping parts to provide an operative connection between the belt and the overlapping parts so that when such overlapping parts move, they move the belt with them, such belt being substantially free of tension prior to such contact with the overlapping parts;

moving the belt only by its contact with the overlapping parts, such moving starting substantially immediately upon such contact;

urging the belt into direct, sliding contact with a surface of the sealing means as the overwrapped package unit is moved therepast, such surface being positioned adjacent the other surface of the belt and out of direct contact with the overlapping parts, and further heating the overlapping parts as the overwrapped package unit and belt move together past the sealing plate, including passing additional heat through the heated belt and onto the overlapping parts, thereby to seal such overlapping parts together, to form the package.

PACKAGE MAKING METHOD

Original Filed June 3, 1971 2 Sheets-Sheet 1

INVENTOR
LOWELL L. SCHOENING

BY Hoge S. Sutherland

ATTORNEY

PACKAGE MAKING METHOD

Original Filed June 3, 1971 2 Sheets-Sheet 2

INVENTOR
LOWELL L. SCHOENING

BY Hoge & Sutherland

ATTORNEY